(12) United States Patent
Belanger et al.

(10) Patent No.: US 7,607,395 B2
(45) Date of Patent: Oct. 27, 2009

(54) CAR WASH CONVEYOR

(75) Inventors: Michael J. Belanger, Novi, MI (US); Barry S. Turner, Novi, MI (US); David L. Tognetti, Howell, MI (US)

(73) Assignee: Belanger, Inc., Northville, MI (US)

( * ) Notice: Subject to any disclaimer, the term of this patent is extended or adjusted under 35 U.S.C. 154(b) by 0 days.

(21) Appl. No.: 11/765,117

(22) Filed: Jun. 19, 2007

(65) Prior Publication Data

US 2007/0284223 A1  Dec. 13, 2007

Related U.S. Application Data

(63) Continuation of application No. 11/303,317, filed on Dec. 16, 2005, now Pat. No. 7,243,605, which is a continuation of application No. 10/835,210, filed on Apr. 28, 2004, now abandoned.

(51) Int. Cl.
 *E01B 25/22* (2006.01)
(52) U.S. Cl. .................................................. 104/107
(58) Field of Classification Search ................ 104/162, 104/165, 172.1, 172.3, 106, 107
See application file for complete search history.

(56) References Cited

U.S. PATENT DOCUMENTS

| 4,576,098 A | 3/1986 | Belanger et al. |
| 4,690,065 A | 9/1987 | Belanger et al. |
| 4,715,287 A | 12/1987 | Wentworth et al. |
| 4,864,936 A * | 9/1989 | Rietsch, Jr. ............... 104/172.1 |
| 4,930,424 A * | 6/1990 | Astley ..................... 104/172.3 |

* cited by examiner

*Primary Examiner*—S. Joseph Morano
*Assistant Examiner*—Robert J McCarry, Jr.
(74) *Attorney, Agent, or Firm*—Young Basile (57) ABSTRACT

An auto-laundry conveyor of three-tier design using upper, lower and intermediate track rails with a narrow slot between them. Dollies are provided in an endless loop conveyor chain and each dolly comprises a combination of a center link, a pair of reversely similar tire engaging rollers, a pair of reversely similar track engaging rollers outboard of the tire engaging rollers and a pair of reversely similar stabilizing rollers outboard of the track engaging rollers. The stabilizing rollers are effectively larger in diameter; i.e., higher than the track engaging rollers so as to prevent rolling contact between the stabilizing rollers and the track surface and to receive the tread surface of an off-center tire and keep the tread surface from interfering with rolling movement of the track engaging rollers. The conveyor is manufactured in 10-foot lengths except for the entry and exit sections which are of lengths X and Y wherein X plus Y equals 10 feet. An open track structure is used to prevent the accumulation of dirt and debris.

2 Claims, 8 Drawing Sheets

CAR WASH CONVEYOR

RELATED APPLICATION

This application is a continuation of U.S. application Ser. No. 11/303,317 filed on Dec. 16, 2006 now U.S. Pat. No. 7,243,605 which is a continuation of U.S. application Ser. No. 10/835,210 filed on Apr. 28, 2004, which is abandoned.

FIELD OF THE INVENTION

This invention relates to auto-laundry conveyors of the type employing an endless loop chain linking a plurality of dollies which roll along slotted tracks in both the vehicle conveying and return directions.

BACKGROUND OF THE INVENTION

In auto-laundries, otherwise known as car washes, it is known to use endless chain conveyors of the type having "dollies" linked into the chain at regular intervals. The dollies are used to push vehicles along the conveyor by engaging the tread surface of a tire. To function properly dollies must have tire engaging rollers and track engaging rollers. Typically the tire engaging rollers are larger in diameter than the track engaging rollers and are disposed in a center slot between opposite longitudinally extending track rails. The dollies include an axle member on which the rollers are mounted. Dollies are connected into the continuous loop chain by means of a center link which may be mounted on the axle.

The track structure which is used in combination with the chain and the dollies typically comprises three separate tracks mounted in parallel and at different levels. The top track accommodates the tire of the vehicle being laundered and also provides the travel path for dollies which are selected at any given time. An intermediate level track provides the forward track for unselected dollies and the bottom level track provides a return path. A selector is used to transfer dollies from the intermediate to the top level tracks when a vehicle is present to be conveyed.

It is desirable to have the gap between the parallel rails as small as possible. A practical limit of about two or three inches is imposed by the need to have tire engaging rollers make stable contact with the vehicle tire when pushing a vehicle along the conveyor.

Belanger, Inc., assignee of the present invention, has for many years utilized a novel dolly design using rollers which engage both the top and bottom surfaces of the track. See U.S. Pat. No. 4,715,287 "Vehicle Conveyor and Wheel Engaging Dolly," issued Dec. 29, 1987. This dolly permits the use of a fairly narrow slot while maintaining stability in the engagement between the dollies and the tires of vehicles being conveyed.

Another problem associated with slotted track auto-laundry conveyors arises out of the fact that dirt and debris falls through the slot and collects in the track structure. The track rails are usually made from L-shaped angle irons and this provides corners which collect dirt. After a while, accumulated dirt can interfere with the proper contact of the track engaging rollers with the intermediate and lower tracks. This in turn causes unusual roller wear which interferes with proper operation of the conveyor.

Another problem associated with auto-laundry conveyors of conventional design arises out of the design of the guard rails which are used to maintain the tires of a vehicle being conveyed on the track; i.e., many vehicles have worn tires or wheels that are out of alignment and these vehicles tend to veer off center and try on their own to exit the track. A guard rail must be designed in such a way as to turn vehicles back onto the track and to prevent the side wall of the tire from climbing over the guard rail and exiting the track. However, the guard rail should be designed to avoid damaging the wheels of the vehicles being conveyed.

Still another problem arises in the use, installation and operation of conventional auto-laundry conveyors in that the conveyors are typically constructed in a modular fashion using pieces of constant length, typically 10 feet, to construct conveyor tracks of varying length. The entry and exit sections tend to become heavy because they include additional components: the exit section typically comprises a drive motor and the entry section typically comprises a dolly selector and a take-up mechanism all of which add weight to these sections making it difficult to handle them during the installation and/or replacement phases.

SUMMARY OF THE INVENTIONS

A first inventive aspect of the present disclosure is the design and construction of an improved conveyor dolly which permits the use of a narrow track slot while at the same time provides stability in the engagement of the dolly with an automobile tire. In general, this is accomplished by providing a dolly having an axle member, a center link mounted on the axle member, a first pair of relatively closely spaced larger diameter tire engaging rollers on opposite sides of the center link, a pair of smaller diameter track engaging rollers mounted on the axle member in reversely similar relationship and outboard of the tire engaging rollers and a pair of tire stabilizing rollers mounted on the axle member in reversely similar relationship and outboard of the track engaging rollers. The tire stabilizing rollers are arranged to ride above and out of contact with the tracks but to at least approximately equal the diameter of the tire engaging rollers at a point of tangency with the tire tread. The stabilizing rollers prevent contact between the tread surface of the tire and the track engaging rollers, which contact would otherwise tend to stall the track engaging rollers and cause them to skid along the track, an undesirable situation which produces flat spots and excessive wear on the track engaging rollers. All of the rollers of the present invention lie on or above the top surfaces of the track rails when in operation.

In the preferred embodiment the dolly comprises means for mounting the innermost tire engaging rollers and the track engaging rollers on a single axle member in an eccentric fashion whereas the outboard tire stabilizing rollers are mounted on the axle member on center. This arrangement has the effect of making the stabilizing rollers sit higher than the track rollers and at least approximate the radius of the tire engaging rollers at a tire contact tangent point thus preventing a tire which is off center from contacting the track rollers and preventing free rotation thereof. Novel large diameter roller and thrust bearings are provided between all of the rollers to provide for independent rotation thereof. Thus, the track rollers have rolling contact with the track at all pertinent times and the tire engaging rollers have rolling contact with the tire at all pertinent times.

Another aspect of the disclosure includes the design of a three-level track which is characterized by spaced-apart parallel vertical supports and intermediate and lower slotted track rails of "open" and cornerless design to facilitate cleaning and to help prevent the accumulation of dirt and debris within the track structure.

Another inventive aspect of the disclosure is the design of a novel guard rail including an extrusion which maintains vehicles on the track. The novel guard rail comprises in combination a simple angle iron which is disposed along the conveyor and to one side thereof and an extrusion of elastomeric material which has a non-uniform thickness and is mounted on the angle iron so as to conform to the horizontal and vertical outer surfaces thereof and further to provide a profile which defines a linear contact with the tire side wall to reduce the tendency of tires to climb over the guard rail. The extrusion is preferably made of polyethylene so as to prevent damage to wheel surfaces.

Still another inventive aspect of the present disclosure is the design of a modular conveyor comprising an entry section of length X, an exit section of length Y wherein X plus Y equals 10 feet, such that conveyors can be constructed in 10-foot increments wherein each of the entry and exit sections is of substantially less than 10 feet in length thereby reducing weight and difficulty in handling.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENTS

Figure 1:
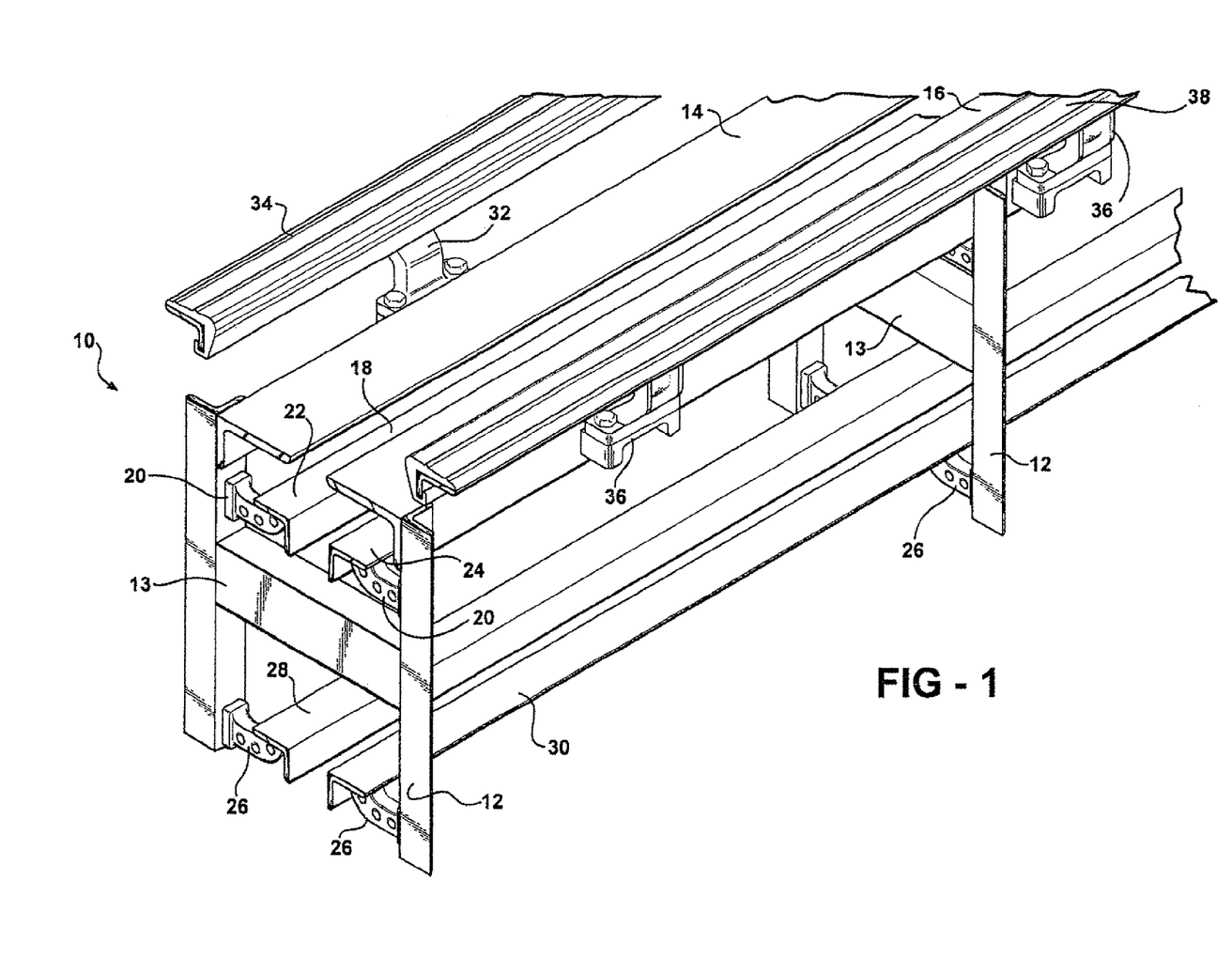
FIG. 1 is a perspective view of a first three-tier conveyor track designed according to one aspect of the present invention.
Figure 2:
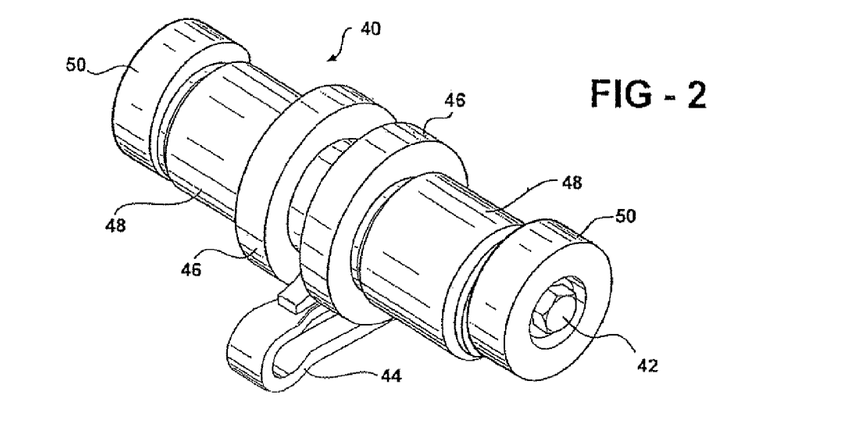
FIG. 2 is a perspective view of a dolly useful in the conveyor of FIG. 1.
Figure 6:
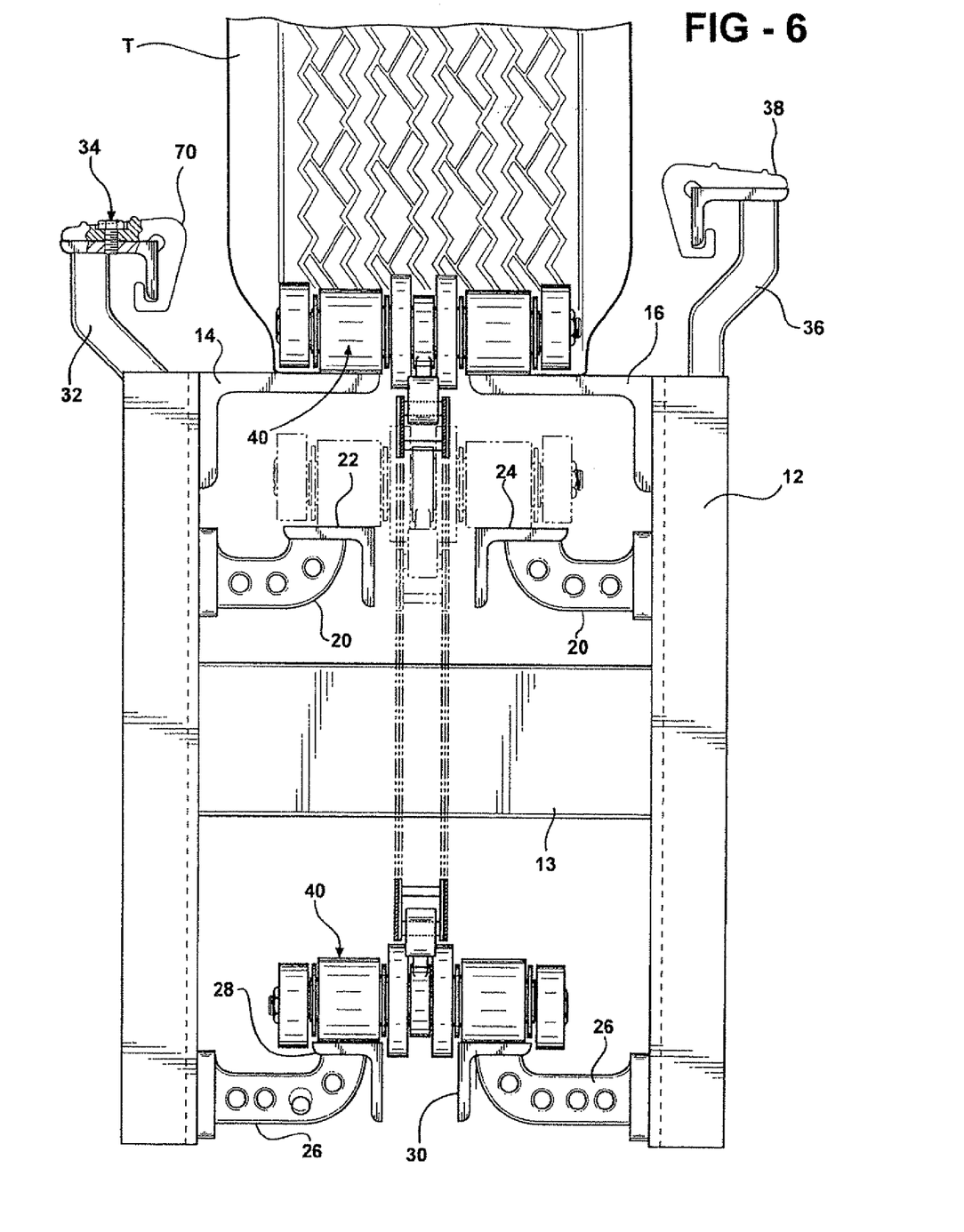
FIG. 6 is an end view showing the three-tier track structure along with a dolly engaging a tire on the top track and also showing an end view of guard rails which are constructed in accordance with the present invention.

Referring to FIGS. 1 and 6, a three-tier auto-laundry conveyor 10 is shown to comprise a welded steel combination of vertical angle iron supports 12 joined at desired intervals by box section cross beams 13. A top track is made up of angle iron track rails 14 and 16 which are welded to the vertical supports 12 in longitudinally extending, parallel, spaced apart relationship to define a relatively narrow center slot 18; i.e., a slot of approximately two and one-half inches in width. The track rails 14 and 16 are adapted to support a vehicle tire T as shown in FIGS. 3, 6, 8 and 10 for rolling contact therewith.

Below the track rails 14 and 16, cantilever support arms 20 are welded and/or bolted to the vertical supports 12 and extend inwardly in reversely similar fashion to support intermediate angle iron track rails 22 and 24 which are also arranged in parallel spaced apart relationship to define a center slot of approximately two and one-half inches in width. Unlike conventional track rails wherein the vertical leg of the angle iron extends upwardly from the outside edge of the horizontal leg to define an upper/outer corner, the vertical legs of the track rails 22 and 24 depend downwardly from the inside edges of the horizontal portions to create a flat track top. This eliminates upside crevices or corners into which dirt can accumulate. By mounting the "cornerless" track rails on the verticals 12, an open structure is created which is easily washed with a hose or integral spray system to prevent the accumulation of dirt and debris.

Below the intermediate track comprising rails 22 and 24, a second set of cantilever support arms 26 is secured to the inside surfaces of the vertical supports 12. The lower cantilever support arms 26 receive cornerless, flat-top track rails 28 and 30 which are configured similar to the rails 22 and 24 to eliminate dirt and debris catching corners and to provide an open structure having the advantages described above. As hereinafter explained, the top surfaces of the rails 14 and 16 not only support the tire T of the vehicle being laundered but also supports the track engaging rollers of dollies 40 which are selected by apparatus hereinafter described when a vehicle is present. The intermediate track rails 22 and 24 provide a forward path for unselected dollies 40 while the lowermost rails 28 and 30 provide a return path for dolly 40 as hereinafter described. The structure of FIG. 1 can be taken as representative of any section of the conveyor track which is usually constructed in 10-foot lengths or modules for assembly at the car wash site.

Continuing with the description of the structure of FIG. 1, support brackets 32 are mounted to the rail 14 at selected intervals to receive and support a left-side guard rail structure 34 which prevents vehicles from inadvertently veering off of the conveyor track rails 14, 16 while they are being conveyed. Similar brackets 36 are mounted to the right-side track rail 16 to support and receive a guard rail structure 38 which is reversely similar to the guard rail structure 34. In the typical installation, one of the guard rail structures is slightly higher than the other; i.e., the outboard guard rail structure is the higher.

Looking now to FIGS. 2, 3, 4 and 5, the details of the dollies 40 will be described.

Figure 3:
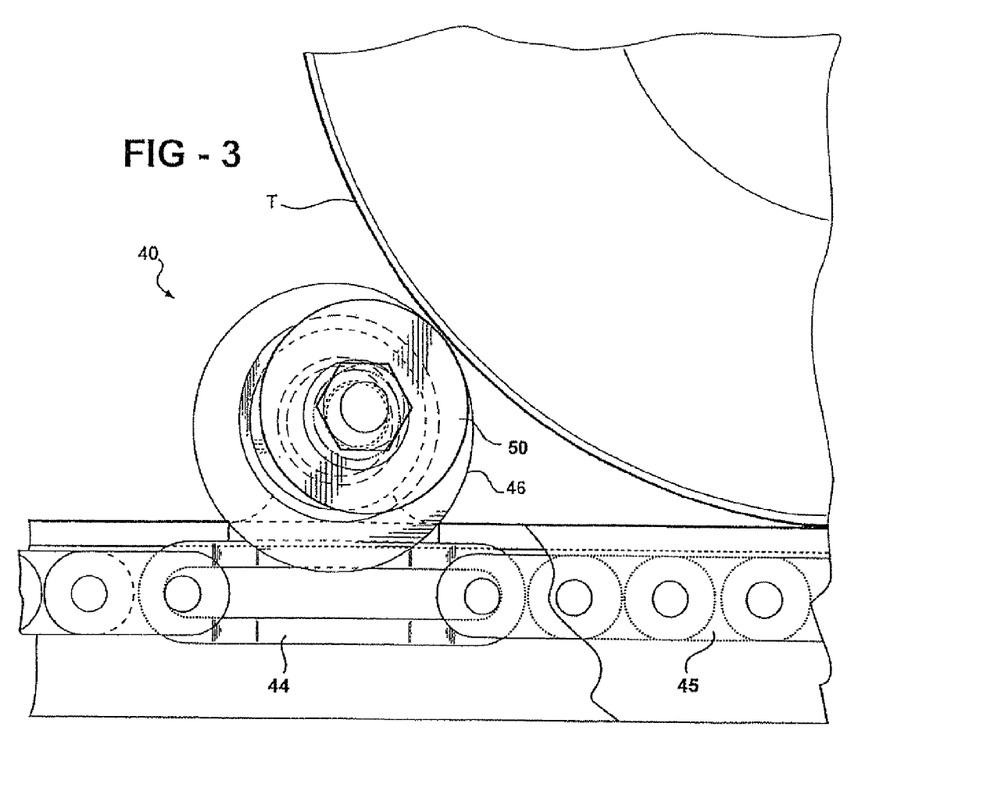
FIG. 3 is a side view of the dolly of FIG. 1 showing its relationship to an endless loop conveyor chain and a tire being conveyed along a slotted track.
Figure 4:
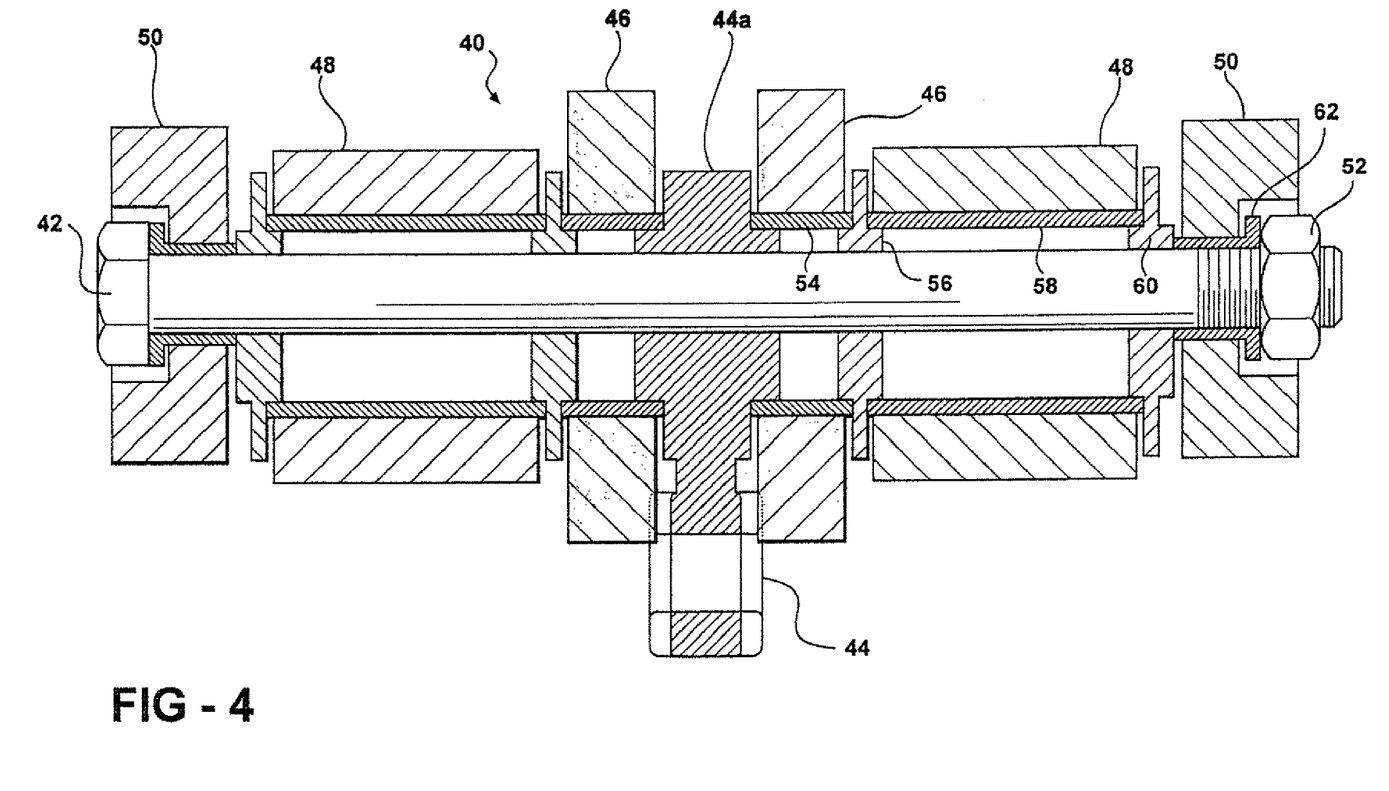
FIG. 4 is a sectional view of the dolly structure of FIG. 2 showing the relationship between the rollers and the bearings for the rollers.
Figure 5:
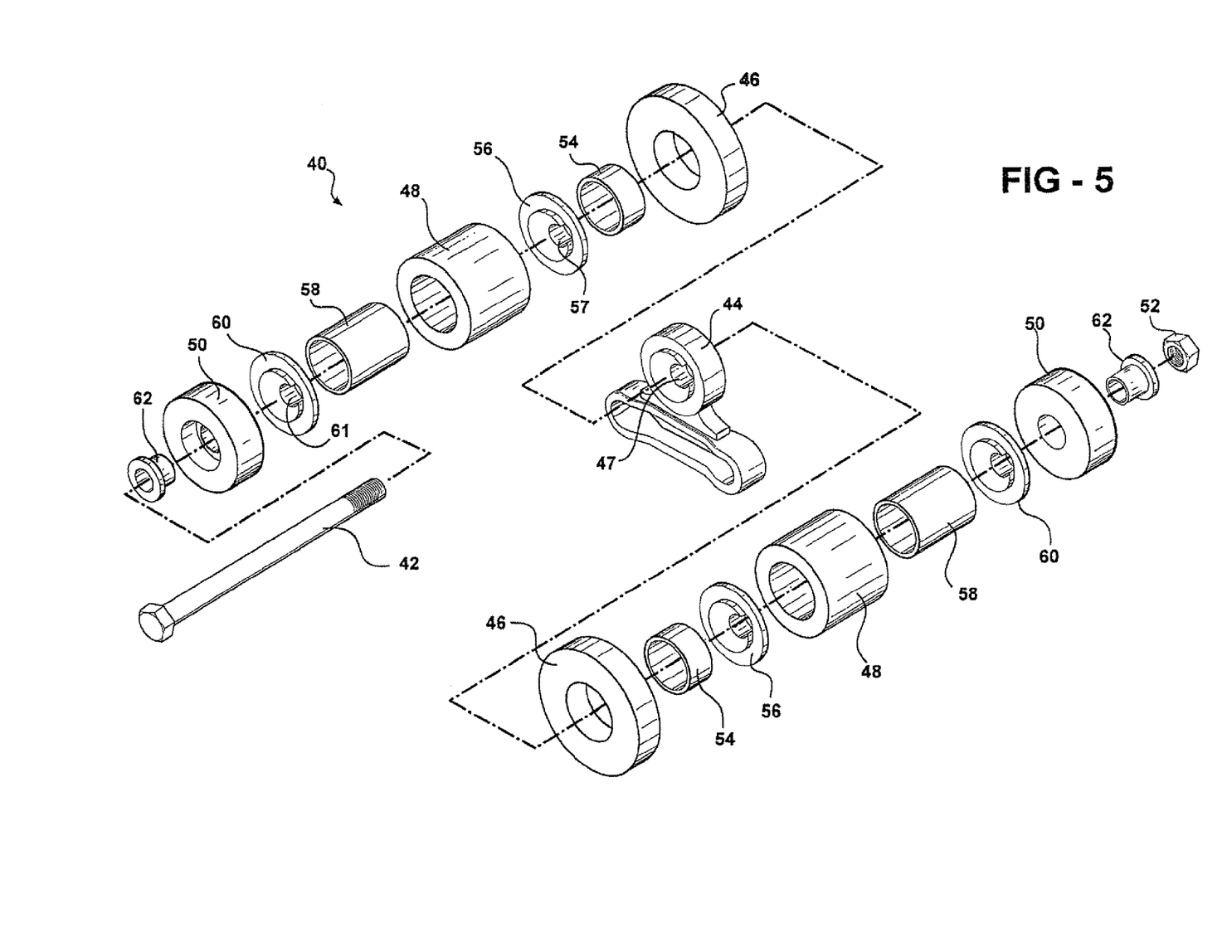
FIG. 5 is an exploded view of the dolly of FIG. 4.

Each of the dollies 40 comprises a long steel axle member 42 in the form of a steel bolt having a threaded end which receives a nut 52. Mounted on the axle member 42 is a center link 44 which is adapted to be connected into and form a part of an endless loop chain 45 diagrammatically indicated in each of FIGS. 3 and 10. The center link 44 comprises a round-shouldered portion 44a having an eccentric or off-center through-hole 47 to receive the axle member 42. The circular portion 44a of the center link provides both radial and thrust bearing surfaces as shown. The overall order of the assembly relative to the center link 44 includes larger diameter tire engaging rollers 46 arranged in a reversely similar pair, smaller diameter track engaging rollers 48 mounted outboard of the tire engaging rollers 46 to engage the opposite track rails of the structure of FIG. 1 and, at the most outboard position, a pair of stabilizing rollers 50 arranged in a reversely similar manner, the entire assembly being held together by means of nut 52. As shown in FIG. 5, the tire engaging roller is mounted on a radial bearing 54 which interfits with the shouldered portion 44a of the center link 44 as shown in FIG. 4. The bearing 54 interfits with bearing members 56 disposed between the tire engaging rollers 46 and the track engaging rollers 48 and also including an off-center through-hole 57 which receives the axle member 42. A set of radial bearings 58 is provided for the track engaging rollers 48 and these bearings 58 coact with thrust bearings 60 which are disposed between the track engaging rollers 48 and the outboard stabilizing rollers 50. Holes 61 in the bearing members 60 are also off center. Bearing members 62 support the stabilizing rollers 50 and the holes through the bearings 62 are on center as opposed to the off-center holes 61 and 57 in the bearing members 60 and 56 respectively. As a result of the off-center holes 47, 57 and 61 in the elements 44, 56 and 60 and the on-center holes in the bearing members 62, the outboard stabilizing rollers, although they are essentially the same diameter as the rollers 48, sit higher when the dolly 40 is disposed on one of the sets of tracks and do not contact the track surfaces. In addition, as shown in FIG. 3, the rollers 50 at least approximate the radius of the tire engaging rollers 46 at a tangent point of contact with tire T. The advantage of this arrangement is to prevent the tire T of a vehicle being conveyed from engaging and stalling the rollers 48 if the tire T moves off center relative to the tire engaging rollers 46. Should this happen, engagement between the tire T and the rollers 48 could stall the rollers causing them to skid or scrape along the track surface. Instead, the tire T, should it be off line, will engage the outer circumference of one of the stabilizing rollers 50 which is high enough relative to the rollers 48 to prevent contact between the tire tread and the rollers 48. It will be noted that the rollers 50 sit above the tracks as shown in FIG. 8 and may roll freely when engaged by the tread of the tire T.

The bearings 54, 56 and/or 56, 58, 60 may be made of separate radial and thrust portions as shown or combined by press-fitting or welding. They provide a large diameter radial bearing with a minimum of material and weight.

As described herein, the rollers 50 have diameters which are "effectively" greater than those of the rollers 48. This term is used to indicate that the outer rolling surfaces of the rollers 50 are higher than the surfaces of the rollers 48 for the reasons described above. This is achieved through the use of the offsets in the bearing structures which place all of the elements 48, 46 and 44 lower on the axle member 42 when viewed from the vantage point of FIG. 4. As an alternative, rollers 50 may be of the same diameter as rollers 46 but this requires a depression to be formed in the track rails to accommodate the larger diameter and prevent the rollers from engaging the surfaces of any of the track rails. From a manufacturing cost standpoint, the arrangement illustrated is preferred.

Figure 7:
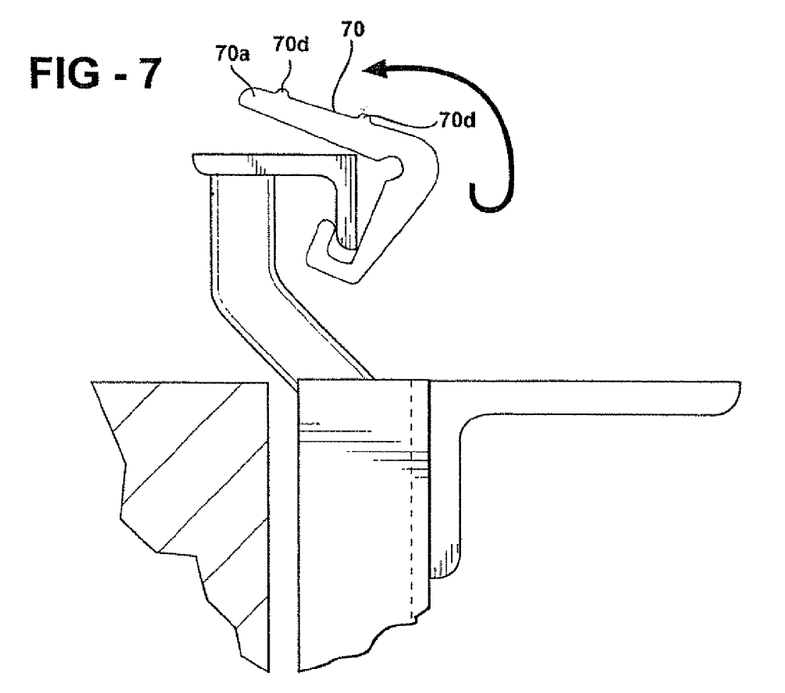
FIG. 7 is a diagram showing how the extrusion is assembled to the underlying angle iron of one of the guard rails of FIG. 6.
Figure 8:
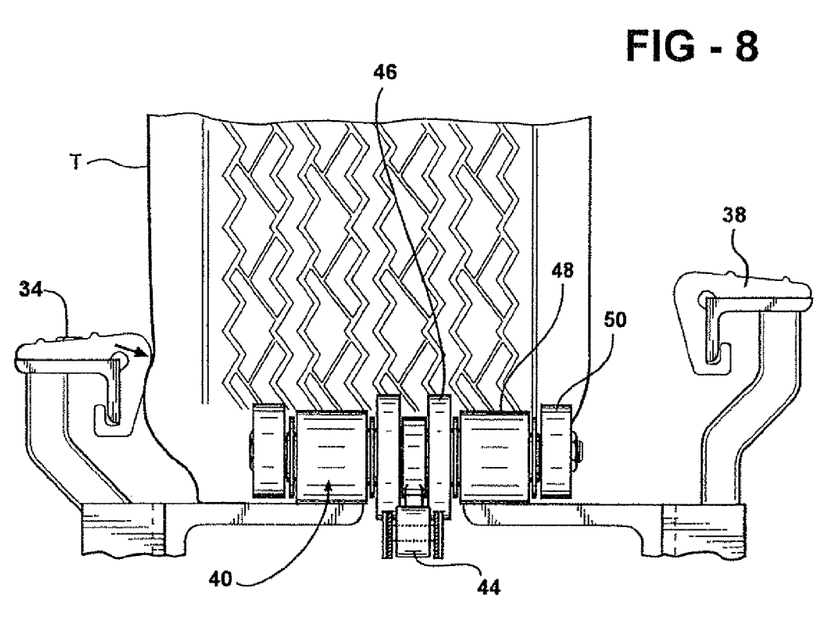
FIG. 8 illustrates contact between the tire of an off center automobile on the upper track and one of the guard rails.

Looking now to FIGS. 6, 7 and 8, the guard rail support bracket 32 is shown to have secured thereto such as by welding an angle iron 65 which receives a high density polyethylene extrusion 70 thereover. The extrusion 70, as best shown in FIG. 7, comprises a top portion 70a, a side portion 70b, and a lower hooked portion 70c. The top portion is further defined by a pair of raised ribs 70d which are parallel and spaced apart for purposes to be described. Finally, the extrusion is configured by non-uniform thickness to provide a profile defining an enlarged linear bead 70e for contact with the side wall of the tire T as hereinafter described.

To install the extrusion 70 on the angle iron 65 of the guard rail 34, for example, the hooked portion 70c is attached to and around the lower edge of the angle iron 65. The extrusion is then rotated as shown by the dark arrow in FIG. 7 into a position wherein the inside surfaces of the extrusion conform to and lie flat against the outside vertical and horizontal surfaces of the angle iron 65 as shown in FIGS. 6 and 8. A fastener may thereafter be used to secure the extrusion 70 to the top surface of the angle iron 65, the fastener preferably being countersunk into the material of the extrusion 70 between the ribs 70d to prevent contact with any outside elements which might cause snagging or damage. Alternatively, clips may be used. The extrusion 70 is preferably a high density elastomeric material which causes no damage to the tire T or the wheel on which it is mounted in the event contact is made. The configuration of the extrusion 70 is such as to provide contact only with the enlarged bead portion; i.e., the vertical portion of the extrusion has a non-vertical, inwardly-angled surface which extends inwardly away from the tire side wall thereby minimizing engagement surface area and reducing the tendency of the tire T to climb over the guard rail in the event of contact.

Figure 9:
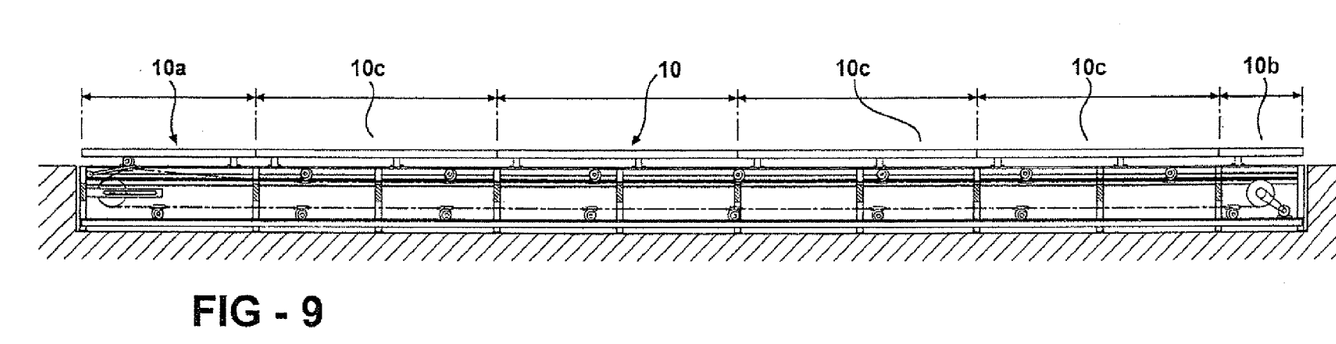
FIG. 9 illustrates the modular design of the entry and exit sections and further illustrates how a dolly is selected for movement between the intermediate and top tracks of the three-tier track structure.
Figure 10:
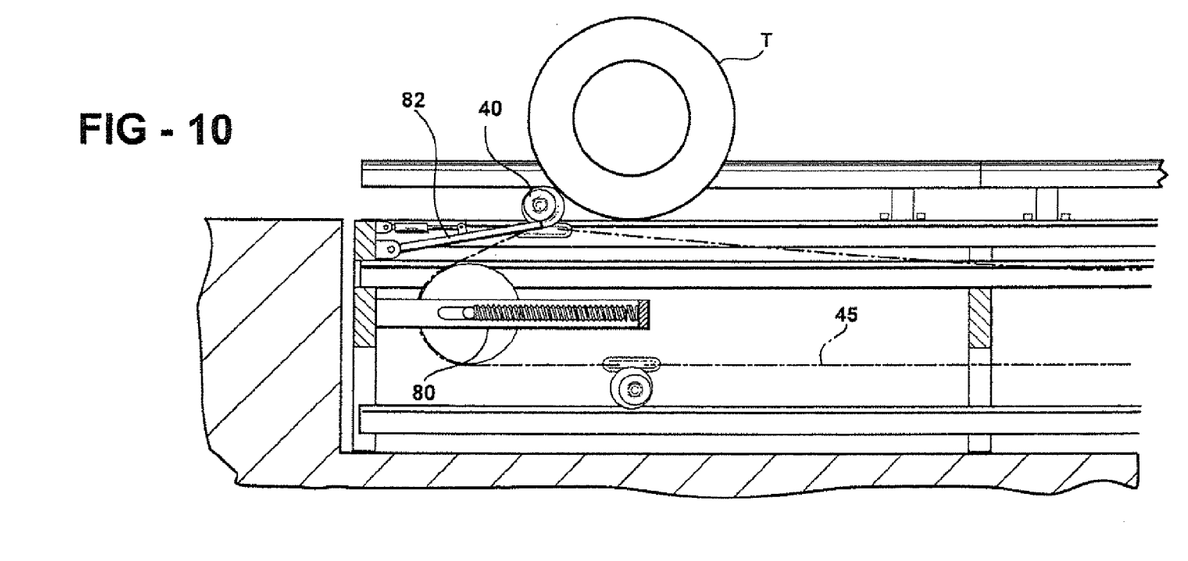
FIG. 10 is a schematic view of a dolly selector and take-up mechanism.

Looking now to FIGS. 9 and 10, the conveyor 10 is preferably manufactured in a modular fashion in 10-foot lengths for transportation to the installation site. The 10-foot lengths are given herein only by way of illustration and any other desired length shall be considered as the equivalent of a 10-foot length. The entry section 10a includes a take-up mechanism 80 and a selector mechanism 82 which allows dollies 40 to be called from the intermediate track rails up to the top track rails whenever a vehicle is present to be conveyed. As to those skilled in the art will understand, the take-up mechanism 80 effectively allows the continuous loop chain to grow or shrink according to the number of dollies 40 which are moved to the selected position shown in FIG. 10.

As shown in FIG. 9, the entry section 10a is approximately six feet in length while the exit section 10b which comprises the conveyor drive motor is approximately four feet in length. The numbers 6 and 10 are represented in this specification by the letters X and Y and the relationship between them is X plus Y equals 10 feet. Accordingly, the total length of the entry section 10a together with the exit section 10b equals that of the intermediate modular sections 10c such that an overall conveyor length in increments of 10 feet can be designed to suit the particular installation. Reducing the length of the entry section 10a and the exit section 10b also reduces their weight which makes them easier to handle and transport for manufacturing and installation purposes.

Figure 11:
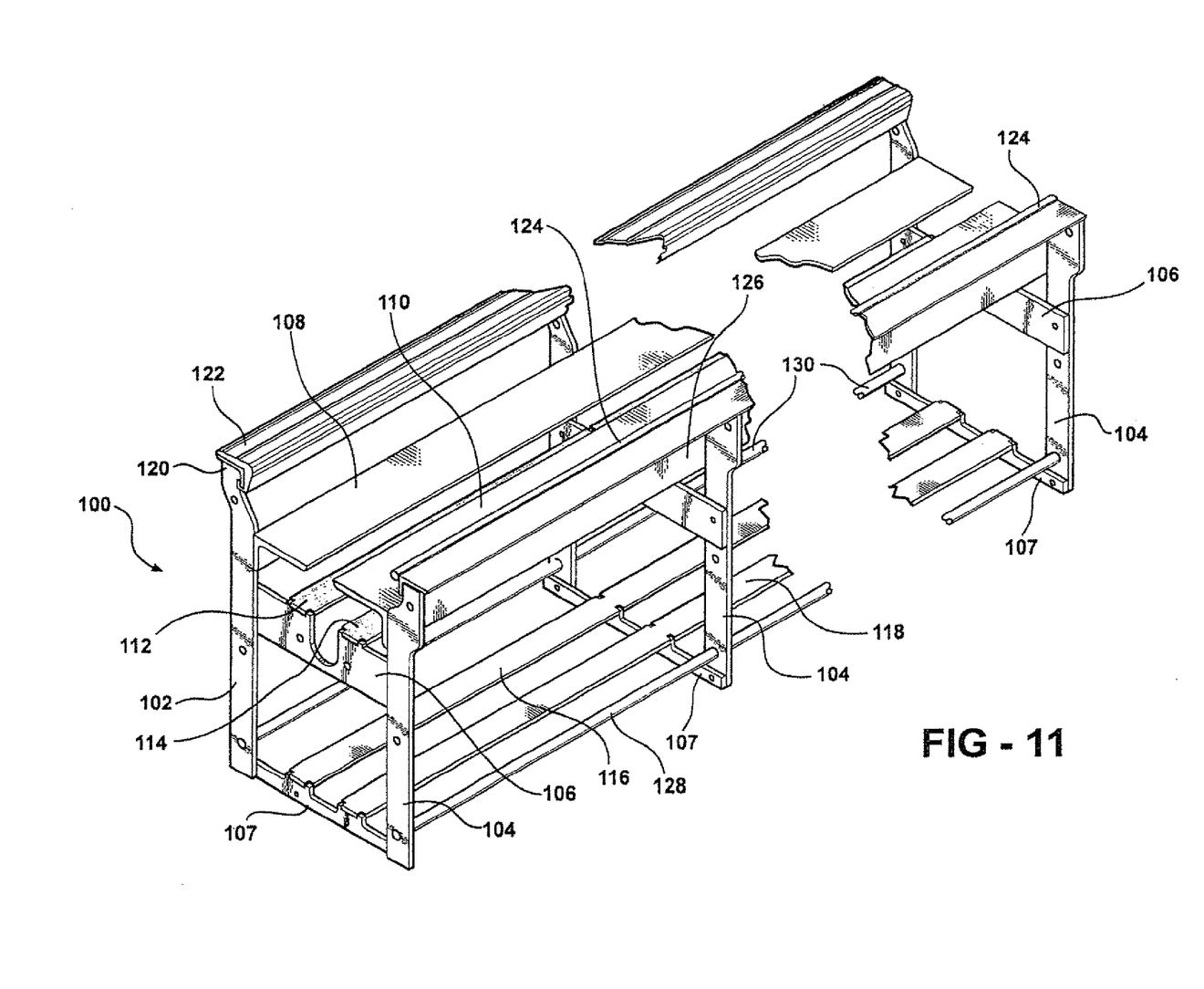
FIG. 11 is a perspective of a second three-level track section.

Turning now to FIG. 11, an alternative track construction 100 is shown. The track structure 100 comprises flat steel vertical legs 102 and 104 joined by cross plates 106 and 107. The upper track is formed by wide angle iron members 108 and 110 separated by an approximately two-inch slot in a manner similar to that of the structure 10 shown in FIG. 1. The angle iron members 108 and 110 are preferably welded to the vertical legs 102 and 104. The intermediate level track is formed by "cornerless" flat steel strips 112 and 114 having notched ends to interfit with complemental structure on the cross plates 106. The track rails 112 and 114 may also be tack welded into place. The bottom track is formed by flat steel track members 116 and 118 which are notched at the ends and along their lengths at approximately 28-inch intervals to interfit with complementally configured portions of the cross plates 107 as shown. Again, these track rails may be tack welded to the cross members as desired.

upper portion 120 of the leg 102 receives an angle iron support for polyethylene extrusion 122 which forms the left side guard rail in the embodiment of FIG. 11. In this case, the left side is the side which matches up with the outside or decorative side of the wheel of automobiles being conveyed along the conveyor track construction 100. On the other side, a simpler structure includes a welded rod 124 which is secured to the corner of an angle iron 126 which in turn is tack welded to the tops of the support legs 104.

If desired, the flat cornerless track structure 100 shown in FIG. 11 may further include steel or plastic water conduits 128 and 130 which may be provided with holes at appropriate intervals to spray the interior of the track and keep it free of dirt and debris. Other integral and non-integral spray mechanisms can also be used. The water conduits can be structural or accessorial.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An auto-laundry conveyor track comprising:
   at least a pair of parallel spaced apart vertical support members;
   a first pair of upper dolly track rails mounted to the inside surfaces of the vertical supports in reversely similar relationship and defining a longitudinal slot therebetween, each of said first pair of rails comprising an angle iron having orthogonal legs which define an inwardly and downwardly opening included angle;
   a second pair of track rails mounted below the upper rails to the vertical support members in spaced apart fashion, each of said second pair of rails comprising an angle iron having orthogonal legs which define an outwardly and downwardly opening included angle; and
   a third pair of track rails mounted to the vertical support members in spaced apart fashion each of said third pair of rails comprising an angle iron having orthogonal legs which define an outwardly and downwardly opening included angle.

2. An auto laundry conveyor track comprising:
   a pair of spaced apart flat metal vertical support members;
   a slotted top track comprising a pair of angle iron members mounted to and between the vertical support members in reversely similar relationship and defining a longitudinal slot therebetween, each of said angle iron members defining downwardly and inwardly opening included angles;
   a first horizontal support plate mounted to and between horizontally spanning the vertical support members below the top track and defining a pair of laterally spaced apart seats;
   a middle track defined by a pair of flat monoplanar metal strips having laterally opposite exposed edges and mounted in parallel spaced apart relationship on said seats;
   a second horizontal support plate mounted to and between horizontally spanning said vertical support members below the first support plate and defining a pair of laterally spaced apart seats; and
   a bottom track defined by a pair of spaced apart parallel monoplanar metal strips having laterally opposite exposed edges and mounted to respective seats on said second horizontal support plate;
   the slot between the angle irons and the spacing between said middle and bottom track strips all being in vertical alignment.

* * * * *